US008514931B2

(12) United States Patent
Cakareski et al.

(10) Patent No.: US 8,514,931 B2
(45) Date of Patent: Aug. 20, 2013

(54) METHOD OF PROVIDING SCALABLE VIDEO CODING (SVC) VIDEO CONTENT WITH ADDED MEDIA CONTENT

(75) Inventors: Jakov Cakareski, Lausanne (CH); Pascal Frossard, La Tour-de-Treme (CH)

(73) Assignee: Ecole Polytechnique Federale de Lausanne (EPFL), Lausanne (CH)

( * ) Notice: Subject to any disclaimer, the term of this patent is extended or adjusted under 35 U.S.C. 154(b) by 719 days.

(21) Appl. No.: 12/408,372

(22) Filed: Mar. 20, 2009

(65) Prior Publication Data

US 2010/0238994 A1 Sep. 23, 2010

(51) Int. Cl.
*H04N 7/12* (2006.01)
(52) U.S. Cl.
USPC .................................................... 375/240.01
(58) Field of Classification Search
USPC .......... 370/390; 375/240.01, 240.15, 240.16, 375/240.26; 705/14.53; 709/250
See application file for complete search history.

(56) References Cited

U.S. PATENT DOCUMENTS

| 7,130,473 | B2 * | 10/2006 | Wu et al. ........................ 382/238 |
| 8,315,315 | B2 * | 11/2012 | Amonou et al. ......... 375/240.27 |
| 2006/0256851 | A1 * | 11/2006 | Wang et al. .............. 375/240.01 |
| 2007/0291837 | A1 * | 12/2007 | Eleftheriadis ............ 375/240.02 |
| 2008/0095228 | A1 * | 4/2008 | Hannuksela et al. .... 375/240.01 |
| 2008/0101456 | A1 | 5/2008 | Ridge |
| 2008/0195761 | A1 * | 8/2008 | Jabri et al. ..................... 709/250 |
| 2008/0292005 | A1 * | 11/2008 | Xu et al. ................... 375/240.28 |
| 2009/0041123 | A1 * | 2/2009 | Haskell et al. ........... 375/240.15 |
| 2010/0008416 | A1 * | 1/2010 | Ben-Zedeff et al. ...... 375/240.02 |
| 2010/0232521 | A1 * | 9/2010 | Hagendorf et al. ....... 375/240.26 |
| 2010/0238994 | A1 * | 9/2010 | Cakareski et al. ........ 375/240.01 |

OTHER PUBLICATIONS

Heiko Schwarz, Ketlev Marpe, and Thomas Wiegand, "Overview of the Scalable Video Coding Extension of the H.264/AVC Standard," *IEEE Transactions on Circuits and Systems for Video Technology*, Sep. 2007, pp. 1103-1120, vol. 17, No. 9, IEEE Xplore.

* cited by examiner

*Primary Examiner* — Tung Vo
*Assistant Examiner* — Stephen Smith
(74) *Attorney, Agent, or Firm* — Blank Rome LLP (57) ABSTRACT

A method of providing SVC video content with added media content, comprising the steps of:
  receiving an original video content transmitted from a remote site in a bit stream and including original video encoding parameters;
  decoding said original video encoding parameters data;
  selecting a complementary media content to be added to the original video content;
  modifying said original video encoding parameters;
  modifying said bit stream in order to integrate the video data of said complementary media content to provide a modified bit stream;
  sending said modified bit stream for decoding;
the additional media content being provided in the form of an additional layer into the scalable bit stream.

26 Claims, 5 Drawing Sheets

METHOD OF PROVIDING SCALABLE VIDEO CODING (SVC) VIDEO CONTENT WITH ADDED MEDIA CONTENT

FIELD OF THE INVENTION

The present invention concerns the insertion of additional media content into an original SVC content provided by a media provider. More particularly, the invention relates to the insertion of targeted media overlay within or upon original visual media content where the media overlay preferably includes user-adaptive advertisement.

DESCRIPTION OF RELATED ART

In the recent years, many targeted advertising methods and systems have been developed and are now provided to media distributors. These methods are sometimes referring to end-user preferences and/or historical data to target specific additional media content, such as advertising, to be provided to those users. In the past, the addition of such graphical overlays have only been possible by first decoding the video sequence, rendering the overlay to be inserted, positioning this content and then re-coding the resulting composite content. Such a process is extremely time consuming and complex. Moreover, it may involve loss of embedded content or loss of quality.

More recently, a method for insertion and overlay of media content upon an underlying visual media has been disclosed in US2008/0101456. The document presents a system and method for enabling the insertion, overlay, removal or replacement of sequential or concurrent targeted program, segments and/or visual icons in a video bit stream. The method involves the creation of a Supplemental Enhancement Information (SEI) message to specifically control and manage the insertion and/or overlay of multiplanar visual content within or upon an underlaying visual media. The SEI message provided involves a wide variety of message fields, such as source ID, source type indicator, rendering window, width/height/spatial axis offset, time placement, duration indicator, key source pointer, region of interest, color blend type/constant, effect indicator, etc. For a logo insertion, the SEI message may either include the logo itself or a pointer (such as an URL) to the location of a logo. It may also include the file format, the spatial location, the transition information, etc.

The SEI message is a proprietary addition to the video encoding format, and is not a part of the standard SVC format. The disclosed method and system thus require the use of a specific decoder to decrypt the SEI message and related data. Existing SVC compatible material shall thus be modified to be compatible with such system. The SEI data type and format vary considerably depending on the context and type of insertion to provide.

Thus, there is a need for a system and method that could be used with any system, including existing material and SVC compatible equipment, without requiring the installation of a separate decoder.

There is also a need for a system and method that is compatible with SVC standard, and avoiding the use of a SEI message.

BRIEF SUMMARY OF THE INVENTION

According to the invention, these aims are achieved by means of a method of providing Scalable Video Coding (SVC) video content with added media content, comprising:

receiving, in a proximal site server with respect to an end-user station, an original video content transmitted from a remote site in a bit stream and including original video encoding parameters;

reading said original video encoding parameters;

selecting a complementary media content to be added to the original video content;

modifying said original video encoding parameters in order to provide modified video encoding parameters;

modifying said bit stream in order to integrate the video data of said complementary media content to provide a modified bit stream;

sending said modified bit stream including said modified video encoding parameters to said end-user station for decoding.

The proposed system does not require the use of any supplemental information to be provided in addition to the video stream in order to perform the media content insertion procedure. The scalable video stream featuring the incorporated media content may be decoded at the receiving station by a standard SVC decoder. The procedure does not require any further information or assistance such as Supplemental Enhancement Information (SEI) messages sent by the network server to the receiving station in order to decode the video stream.

The proposed system and method thus employs only the functionalities provided by SVC in a new way in order to deliver value-added, locally enriched video content.

In a preferred embodiment, the complementary media content is provided in the form of an additional layer into the scalable bit stream.

In a further aspect of the invention, the proximal site is provided with a proxy server monitoring each end-user preferences regarding the served content so that a media content selection unit selects complementary media content to be added to said original video content based on said end-user preferences.

In still another aspect of the invention, the complementary media content is further customized to better fit the video stream content.

In a further embodiment, the video encoding parameters are included in a header. In a variant, video encoding parameters are described in a hint track file that is sent along with the video bitstream.

In a further aspect of the invention, the proximal site server (or proxy server) is located at the last network hop before the end-user station, for example at his Internet Service Provider (ISP). This feature allows additional media content to be inserted into the scalable video stream at the last hop before the stream is delivered to the destined receiver. In the case of advertisement, such a configuration allows to customize publicity to target customers. A proxy server inserts an appropriate advertisement into the content according to the user's preferences and video content selections.

The invention also provides a method of providing Scalable Video Coding (SVC) video content with added media content, comprising:

in a remote site server with respect to an end-user station, providing an original video content including original video encoding parameters for transmission in a bit stream;

in a proximal site server with respect to said end-user station, receiving said original video content;

decoding said original video encoding parameters;

selecting a complementary media content to be added to the original video content;

modifying said original video encoding parameters to include complementary media content specificities in order to provide modified video encoding parameters;

modifying said bit stream in order to integrate the video data of said complementary media content to provide a modified bit stream;

sending said modified bit stream including said modified video encoding parameters to said end-user station for decoding.

The invention also involves an electronic device for use in a Scalable Video Coding (SVC) video content distribution system, comprising:

a processor, and a stream parser unit for reading original video encoding parameters of an original video content received from a sending site in a bit stream;

a media content selection unit for selecting a complementary media content to be added to said original video content;

a video encoding parameters modification unit for modifying said original video encoding parameters to include complementary media content specificities in order to provide modified video encoding parameters;

a layer integration unit for modifying said bit stream in order to integrate the video data of said complementary media content to provide a modified bit stream;

an output unit for sending said modified bit stream to said end-user station for decoding.

In an aspect of the invention, the electronic device is provided with a monitoring device to monitor each end-user preferences regarding the served content and comprises a media content selection unit adapted for selecting complementary media content to be added to said original video content based on said end-user preferences.

In a further aspect of the invention, the electronic device is a proxy server, preferably located at the last network hop before the end-user station.

The invention further involves a computer program, included on a computer readable medium, for use in a Scalable Video Coding (SVC) video content distribution system for providing video content with added media content, comprising:

computer code for reading original video encoding parameters of an original video content received from a sending site server in a bit stream;

computer code for selecting a complementary media content to be added to said original video content;

computer code for modifying said original video encoding parameters to include complementary media content specificities in order to provide modified video encoding parameters;

computer code for modifying said bit stream in order to integrate the video data of said complementary media content to obtain a modified bit stream.

In a preferred embodiment, the computer program further comprises computer code for monitoring each end-user preferences regarding the served content and computer code for selecting complementary media content to be added to said original video content based on said end-user preferences.

Finally, the invention provides a method of rendering Scalable Video Coding (SVC) video content with added media content, comprising:

reading video encoding parameters of a bit stream;

decoding a video content portion of said bit stream;

rendering the decoded video content portion including the added media content based on the video encoding parameters related to said added media content.

These characteristics allow the use of a standard SVC decoder to decode the bit stream and render the video content including the added media content.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Scalable video coding (SVC) allows on-the-fly adaptation to certain application requirements such as display and processing capabilities of target devices, and varying transmission conditions.

The need for scalable video coding comes from the continuous evolution of receiving systems and apparatus and the increasing usage of transmission systems using a widely varying connection quality. Video coding is required in a wide range of applications such as multimedia messaging, video telephony, video conferencing, mobile TV, wireless and Internet video streaming, TV broadcasting (either standard or high-definition), etc. In the last few years, Internet and wireless networks have taken more and more importance for video applications. Furthermore, various decoding devices with heterogeneous display and computational capabilities are used to provide the video content.

In these various environments, flexible adaptation of previously-encoded content is highly preferable, for instance to enable interoperability of encoder and decoder products from different manufacturers. The technical environments of these networks require video transmission to be exposed to variable transmission conditions, which can be dealt with using scalability features.

SVC coding requirements, material specifications and operating rules are now public and known by video coding specialists. For instance, the document 'Overview of the Scalable Video Coding Extension of the H.264/AVC Standard', published in IEEE TRANSACTIONS ON CIRCUITS AND SYSTEMS FOR VIDEO TECHNOLOGY, VOL. 17, NO. 9, September 2007, included herewith by reference, describes in details SVC characteristics, specifications and main technical advantages.

Figure 1:
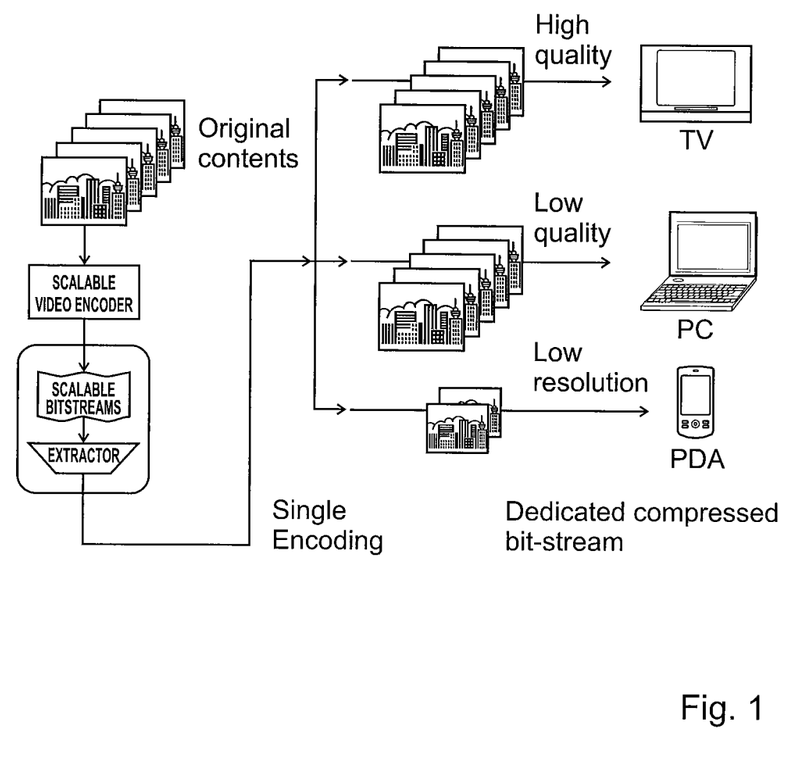
FIG. 1 is an overview diagram showing the key aspects of a known type SVC system.

Referring to the annexed figures, FIG. 1 illustrates the underpinnings of scalable video coding. An original video content is coded with an SVC encoder in order to provide scalable bit streams. An SVC extractor provides the required data, in accordance with the specific application, considering the resolution and the material specificities. For instance, high resolutions images are extracted from the video content for use with high resolution television. Lower quality images may also be extracted from the same coded data to provide the required content for a PC screen. Very low resolution images may also be extracted if required, for instance for a device such as a PDA. Therefore, SVC allows obtaining different resolutions from a single coded data file or stream.

Considering the continuous growth of applications requiring a given set of images to be provided on various medium having different resolutions, SVC coding may represent a considerable advantage in data saving: all applications may share the same file instead of requiring different files.

Figure 2:
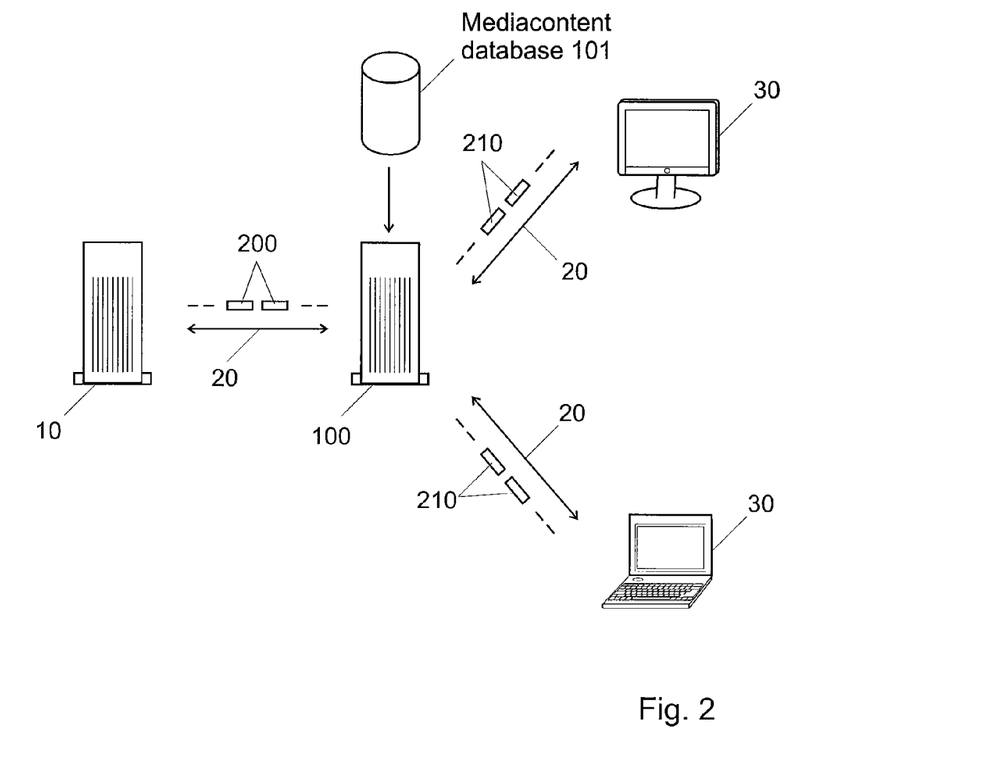
FIG. 2 illustrates an example of SVC system provided with a proxy server as provided by the invention.

FIG. 2 illustrates a SVC network according to the invention. A media server 10 is provided with scalable video content 200 to be distributed over a digital network using network links 20. Various types of network are to be considered, such as Internet, wireless networks, broadcasting networks, etc.

Media content is served to the requesting client by the server 10. The proxy server 100, located in or at the edge of the network and near the client, monitors the client requests and user preferences and/or selections regarding the served content. Based on this information, the proxy server 100 may select from a media content database 101 the appropriate media content, such as advertisement, to be delivered to the client along with the original video stream 200.

The media server 10 and the proxy server 100 are preferably provided in distinct locations. In a preferred embodiment, the media server 10 location provides an efficient access to centralized data to be potentially distributed to several end-user stations 30 used by the clients. Thus, the media server 10 is advantageously provided near the media production or distribution center, whereas the proxy server 100 is preferably provided near the end-user stations 30. A plurality of proxy servers may be used. In the illustrated example, proxy servers 100 are placed in locations close to their related end-user stations 30, for instance at the last network hope, namely because adding specific or targeted additional media content such as advertisement at the last network hop can be more effective than inserting them at the original sender. For instance, the sending server 10 is not overloaded with this task which can add a considerable amount of complexity, especially since media servers usually send multiple streams simultaneously. Moreover, a network proxy server 100 located at the last hop before the final destination can be more responsive in inserting appropriate advertising in the delivered stream according to the receiving user's preferences and selections regarding the video content that is served.

The stations 30 may be embodied by different multimedia terminal types, such as PC, telephone such as a cellular phone provided with a screen, PDA, TV set, etc.

Figure 4:
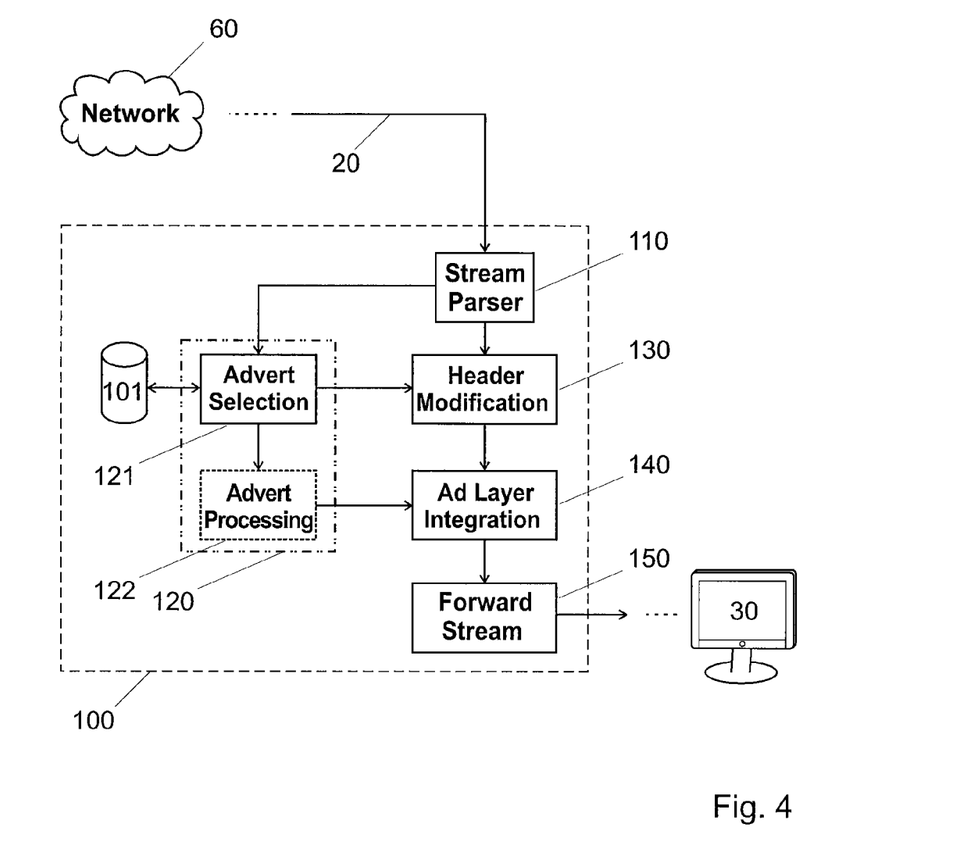
FIG. 4 illustrates the implementation details of a proxy server.
Figure 5:
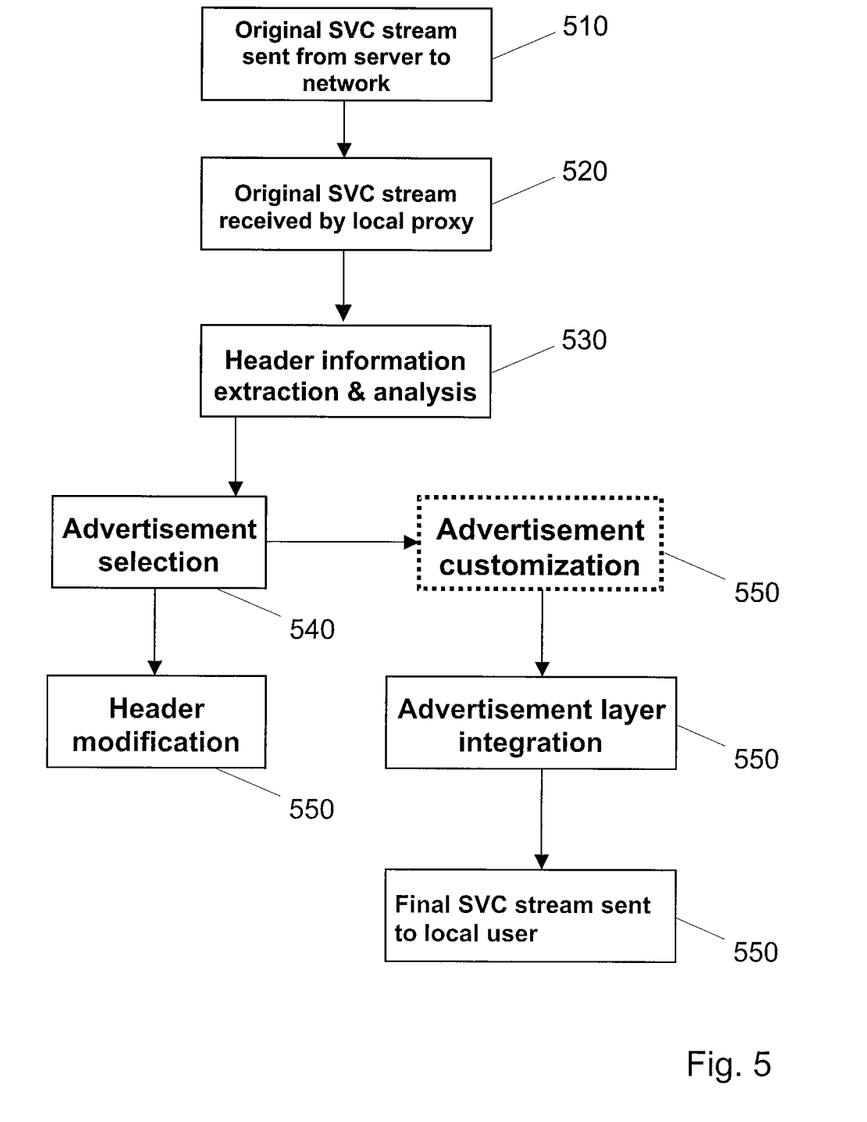
FIG. 5 is a flowchart diagram presenting the method steps according to the invention.

As further explained in relation with FIGS. 4 and 5, the proxy server 100 uses the scalable video content 200 received from the media server 10 via a network link 20 and provides, via another network link 20, scalable video content including complementary video content 210 such a targeted advertisement to each end-user station 30.

FIG. 4 shows a proxy server 100 in more details, with its main functional units. A stream parser unit 110 is provided to receive video data from a network 60. The stream parser unit performs the operation of extracting side information from the video stream.

A media content selection block 121 uses this information, and/or information depending on the client, for the selection of personalized or targeted complementary media content. In one example, the media content selected by the block 121 is independently selected for each user, and depends on information in a personal user profile such as user location, preferences, interests, gender, age and so on. The selected media content may also depend on the video content 20, for example metadata associated with his content, and/or on other criteria chosen by the advertiser.

The additional media content is selected in a media content database 101 provided in the network proxy 100 or in a separate storing device connectable to the proxy server. This content may include video pictures, still pictures, hypertext pages, banners, text pages, etc.

A header modification unit 130 is provided for modifying the header of the SVC video stream, depending on the inserted additional content.

In a variant, advertisement processing unit 122 provides optional image processing of the additional content for instance to better fit the video content. In one embodiment, the size, location and/or color of a banner or advertising window is automatically and/or manually adapted to the format and content of the video content. Such additional customization is preferably done such that the semantics of the original content is not destroyed while still giving the advertisement enough chance for attention by the target audience. For instance, the temporal and texture aspects of the original content can be examined and adapted to the video content in order to determine the most appropriate format for the inserted advertisement.

The advertisement engine 120 comprises the two units 121 and 122. A media content layer integration unit 140 is provided to integrate the binary data corresponding to the additional media content into the modified bit stream received from the header modification unit. To this end, the integration unit 140 modifies the video bit stream in order to insert the data information comprising the additional media content as an extra layer into the SVC, scalable bit stream.

A forward stream unit 150 allows streaming the resulting SVC video stream to the corresponding end-user station 30.

Referring to FIG. 5, the main steps of a method according to the invention are further described. First, at step 510, an original SVC stream is sent by a network server 10, as previously mentioned with FIG. 2. At step 520, this original SVC stream is received by a local proxy server 100, in a second location, closer to the end-user station 30 of the client.

At step 530, video encoding parameters of the stream such as frame rate and maximum picture size of the video frames are extracted and analyzed within the proxy server. The stream parser unit 110 performs this task. During this operation, additional data may also be extracted such as the average quality of the video presentation or any other specific context data included for example in the video stream header. In a preferred embodiment, the video encoding parameters are extracted from the video stream header. In a variant, the video encoding parameters, or side information, are provided through a preamble packet sent ahead of the stream.

The video encoding parameters obtained in step 530 are used in step 540 by the media content selection unit 121 for the selection of complementary media content. As previously mentioned, during this step, selection tools are used for the selection of the most adequate media content considering end-user profile and/or previous video selections from the end-user station 30, or any other relevant selection parameter or criteria. A media content database 101 may be provided either within the proxy server 100 or in a separate saving device, accessible by the proxy server via the network or a separate connection. This database is used by the media content selection unit 121. In a variant, a centralized database, accessible by the proxy server, is used.

In step 550, the header modification unit 130 modifies one or several headers of the SVC stream in order to include all necessary data related to the insertion of the additional media content. The proxy server 100 takes the necessary measures to clearly indicate the addition of the extra layer corresponding to the additional media content in the compressed bit stream delivered to the user station. This will enable proper decoding of the compressed video content upon delivery. The stream and Network Abstraction Layer (NAL) unit headers contain information related to the number and type of layers. Any insertion of an additional layer is reflected in the corresponding headers in order to provide the decoder with enough information for proper decoding. For instance, the stream header may need to contain information that specifies the type of the extra added layer. Similarly the NAL units containing the slices associated with the added media content have their headers carrying the right information describing the data associated with the specific type of layer.

At step 570, the complementary media content layer is integrated into the bit stream. The media content layer integration unit 140 executes this integration, during which additional media content is inserted as a different layer in the scalable video hierarchy created originally at the sending server. As previously mentioned at step 550, proper decoding by a standard SVC decoder of this modified bit stream including additional media content is possible due to the modification of the video stream header.

Step 580 involves the delivery of the modified SVC stream to the local end-user station 30.

Figure 3A:
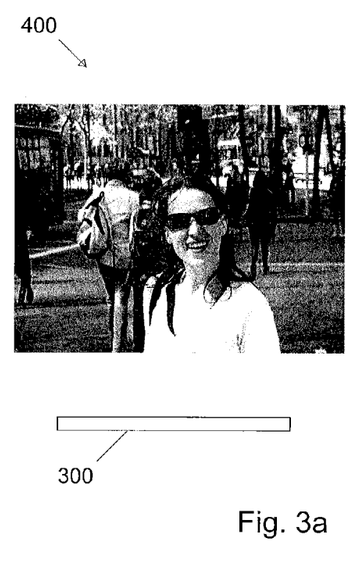
FIG. 3a and 3b show an example of an image before the addition of media content (FIG. 3a) and after such an addition (FIG. 3b), with a schematic representation of an original and modified bit stream.
Figure 3B:
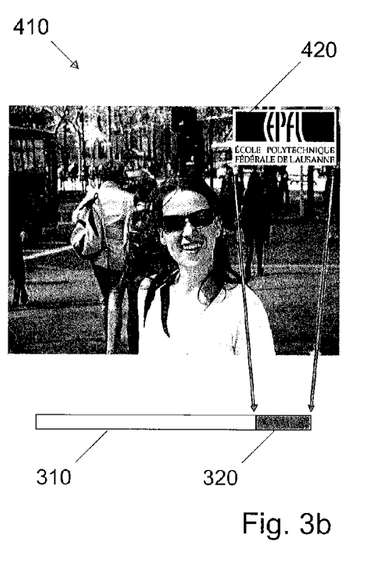

Before step 570, an optional step 560 may be added to provide an additional customization of the video stream content. Finally, FIG. 3a shows an example of an original video content 400, with its corresponding original bit stream 300 that is locally modified in a proxy server 100 to provide, as shown in FIG. 3b, a modified video content involving the original content completed with an additional media content 410 (here the EPFL logo) with its modified bit stream 310 and extra layer 320. In this example, the video content comprising an advertisement is incorporated into the original bit stream as an additional layer of intra-encoded data. This allows the separation of the additional media content from the original video content when decoding the composite signal thereby reducing the complexity of the decoding procedure. The video stream header is appropriately adapted to inform the decoder that an extra layer is inserted into the stream and provide information about its type (SNR, spatial, or temporal). There is thus no need to send any additional/enhancement information beyond the actual bit stream, such as a SEI message.

In the proposed method, the video content comprising the advertisement is incorporated into the original bit stream as an additional layer of intra-encoded data. This allows for separating the advertisement from the original video content when decoding the composite signal thereby reducing the complexity of the decoding procedure.

The proposed method may also be used for the insertion of an additional layer of added media data along the temporal or spatial axis, in addition to the case of signal-to-noise (SNR) ratio scalability illustrated in FIG. 3. In the former two cases, the added media information would represent a separate video frame or part of a video frame that is not overlaid on top of the already existing video content.

The above detailed description with reference to the drawings illustrates rather than limit the invention. There are numerous alternatives, which fall within the scope of the appended claims. The word "comprising" does not exclude the presence of other elements or steps than those listed in a claim. The word "a" or "an" preceding an element or step does not exclude the presence of a plurality of such elements or steps. The mere fact that respective dependent claims define respective additional features, does not exclude a combination of additional features, which corresponds to a combination of dependent claims.

What is claimed is:

1. A method of providing scalable video coded video content with added media content, comprising:

in a remote site server with respect to an end-user station, providing an original scalable video coded video content having header data and including original video encoding parameters for transmission in a bit stream;

in a proximal site server with respect to said end-user station, receiving said original scalable video coded video content;

extracting the video encoding parameters from the video stream header and decoding said original scalable video coded video encoding parameters;

selecting a complementary media content to be added to the original video content;

modifying said original video encoding parameters of the video stream header in order to provide modified video encoding parameters including complementary media content specificities by modifying at least one header of the scalable video coded stream;

modifying said bit stream in order to integrate the video data of said complementary media content to provide a modified bit stream;

providing said complementary media content in a form of an additional layer integrated into the original scalable bit stream;

sending said modified bit stream including said modified video encoding parameters and said additional layer to said end-user station for decoding of a composite signal including additional media content separated from original video content.

2. The method of claim 1, in which the proximal site is provided with a proxy server storing individual end-user profiles so that a media content selection unit selects complementary media content to be added to said original video content based on said end-user profile.

3. The method of claim 1, in which the complementary media content is further automatically adapted to the video stream content.

4. The method of claim 1, in which the video encoding parameters are included in a header.

5. The method of claim 1, in which the video encoding parameters are included in a hint track information stream that is sent along with the video bitstream.

6. The method of claim 1, in which the proximal site server is located at the last network hop before the end-user station.

7. A method of providing scalable video coded video content with added media content, comprising:

receiving, in a proximal site server with respect to an end-user station, an original scalable video coded video content including header data transmitted from a remote site in a bit stream and including original scalable video coded video encoding parameters;

extracting the video encoding parameters from the video stream header and decoding said original scalable video coded video encoding parameters data;

selecting a complementary media content to be added to the original video content;

modifying said original video encoding parameters of the video stream header in order to provide modified video encoding parameters including complementary media content specificities by modifying at least one header of the scalable video coded stream;

modifying said bit stream in order to integrate the video data of said complementary media content to provide a modified bit stream;

providing said complementary media content in a form of an additional layer integrated into the original scalable bit stream;

sending said modified bit stream including said modified video encoding parameters and said additional layer to said end-user station for decoding of a composite signal including additional media content separated from original video content.

8. The method of claim 7, in which the proximal site is provided with a proxy server storing individual user profiles so that a media content selection unit selects complementary media content to be added to said original video content based on said end-user profiles.

9. The method of claim 7, in which the complementary media content is adapted to the video stream content.

10. The method of claim 7, in which the video encoding parameters are included in a header.

11. The method of claim 7, in which the video encoding parameters are included in a hint track information stream that is sent along with the video bitstream.

12. The method of claim 7, in which the proximal site server is located at the last network hop before the end-user station.

13. An electronic device for use in a scalable video coded video content distribution system, comprising:

a processor, and a stream parser unit for reading original scalable video coded video encoding parameters of an original video content including header data received from a sending site in a bit stream and extracting the video encoding parameters from the video stream header;

a media content selection unit for selecting a complementary media content to be added to said original scalable video coded video content;

a video encoding parameters modification unit for modifying said original video encoding parameters of the video stream header in order to provide modified video encoding parameters including complementary media content specificities by modifying at least one header of the scalable video coded stream;

a layer integration unit for modifying said bit stream in order to integrate the video data of said complementary media content to provide a modified bit stream and for providing said complementary media content in a form of an additional layer integrated into the original scalable bit stream;

an output unit for sending said modified bit stream including said video encoding parameters and said additional layer to said end-user station for decoding of a composite signal including additional media content separated from original video content.

14. The electronic device of claim 13, provided with a monitoring device to store end-user profiles and comprising a media content selection unit adapted for selecting complementary media content to be added to said original video content based on said end-user profiles.

15. The electronic device of claim 13, wherein said device is a proxy server.

16. The electronic device of claim 13, located at the last network hop before the end-user.

17. A computer program, included on a non-transitory computer readable medium, for use in a scalable video coded video content distribution system for providing scalable video coded video content with added media content, comprising:

computer code for extracting the video encoding parameters from the video stream header and decoding original scalable video coded video encoding parameters of an original scalable video coded video content including header data received from a sending site server in a bit stream;

computer code for selecting a complementary media content to be added to said original video content;

computer code for modifying said original video encoding parameters of the video stream header in order to provide modified video encoding parameters including complementary media content specificities by modifying at least one header of the scalable video coded stream;

computer code for modifying said bit stream in order to integrate the video data of said complementary media content to obtain a modified bit stream;

computer code for providing said complementary media content in a form of an additional layer integrated into the original scalable bit stream;

computer code for sending said modified bit stream including said modified video encoding parameters and said additional layer to said end-user station for decoding of a composite signal including additional media content separated from original video content.

18. The computer program of claim 17, further comprising computer code for storing end-user profiles and computer code for selecting complementary media content to be added to said original video content based on said end-user profiles.

19. The computer program of claim 17, in which the complementary media content is adapted to the video stream content.

20. The computer program of claim 17, in which the video encoding parameters are included in a header.

21. The computer program of claim 17, in which the video encoding parameters are included in a hint track information stream that is sent along with the video bitstream.

22. The computer program of claim 17, adapted for use at the last network hop before an end-user station.

23. A method of providing scalable video coded video content with added media content, comprising:

considering, in a server, an original scalable video coded video content having header data to be transmitted to an end-user station in a bit stream and including original scalable video coded video encoding parameters;

extracting the video encoding parameters from the video stream header and decoding said original scalable video coded video encoding parameters data;

selecting a complementary media content to be added to the original video content;

modifying said original video encoding parameters of the video stream header in order to provide modified video encoding parameters including complementary media content specificities by modifying at least one header of the scalable video coded stream;

modifying said bit stream in order to integrate the video data of said complementary media content to provide a modified bit stream;

providing said complementary media content in a form of an additional layer integrated into the original scalable bit stream;

sending said modified bit stream including said modified video encoding parameters and said additional layer to said end-user station for decoding of a composite signal including additional media content separated from original video content.

24. The method of claim 23, in which the server is provided for storing individual user profiles so that a media content selection unit selects complementary media content to be added to said original video content based on said end-user profiles.

25. The method of claim 23, in which the video encoding parameters are included in a header.

26. The method of claim 23, in which the video encoding parameters are included in a hint track information stream that is sent along with the video bitstream.

* * * * *